(12) United States Patent
Chern et al.

(10) Patent No.: US 9,977,305 B2
(45) Date of Patent: May 22, 2018

(54) SPATIAL INFORMATION CAPTURING DEVICE

(71) Applicant: EVERREADY PRECISION IND. CORP., Kaohsiung (TW)

(72) Inventors: Jyh-Long Chern, Taipei (TW); Chih-Ming Yen, New Taipei (TW)

(73) Assignee: EVERREADY PRECISION IND. CORP., Kaohsiung (TW)

( * ) Notice: Subject to any disclaimer, the term of this patent is extended or adjusted under 35 U.S.C. 154(b) by 215 days.

(21) Appl. No.: 14/996,785

(22) Filed: Jan. 15, 2016

(65) Prior Publication Data

US 2017/0150119 A1    May 25, 2017

(30) Foreign Application Priority Data

Nov. 20, 2015    (CN) .................... 2015 2 0934812 U
Nov. 20, 2015    (TW) ............................ 104218718 U

(51) Int. Cl.
   *G02F 1/137*      (2006.01)
   *G01B 11/25*      (2006.01)
   *H04N 13/02*      (2006.01)

(52) U.S. Cl.
   CPC .......... *G02F 1/137* (2013.01); *G01B 11/2513* (2013.01); *H04N 13/0253* (2013.01); *H04N 13/0271* (2013.01)

(58) Field of Classification Search
None
See application file for complete search history.

(56) References Cited

U.S. PATENT DOCUMENTS

| | | | | |
|---|---|---|---|---|
| 2007/0122153 A1* | 5/2007 | Tamai | .................... | H04J 14/005 398/77 |
| 2010/0283943 A1* | 11/2010 | Kimura | ............... | B32B 38/1841 349/96 |
| 2012/0104242 A1* | 5/2012 | Chin | .................. | G01D 5/34715 250/231.1 |
| 2015/0055960 A1* | 2/2015 | Zheng | .................. | H04B 10/503 398/135 |
| 2015/0265187 A1* | 9/2015 | Bernal | ................. | A61B 5/1128 600/474 |

\* cited by examiner

*Primary Examiner* — Eileen M Adams
(74) *Attorney, Agent, or Firm* — Muncy, Geissler, Olds & Lowe, P.C.

(57) ABSTRACT

A spatial information capturing device includes a structured light generation module, a camera module and a process controller. The structured light generation module provides a structured light pattern to a target object, so that an evaluation pattern is formed on the target object. The camera module includes a lens group, an optical encoder and a sensing unit. The optical encoder has a reference pattern. The reference pattern and the evaluation pattern have at least one corresponding pattern feature. In addition, both of the reference pattern and the evaluation pattern are projected on the sensing unit. The process controller compares a pattern feature difference between the reference pattern and the evaluation pattern, and realizes a spatial distance information of the target object according to a result of comparing the pattern feature difference. Hence, the configuration or structure of the spatial information capturing device is simplified.

12 Claims, 4 Drawing Sheets

SPATIAL INFORMATION CAPTURING DEVICE

FIELD OF THE INVENTION

The present invention relates to a spatial information capturing device, and more particularly to a spatial information capturing device including a structured light generation module to generate a pattern and a camera module to capture the pattern in order to extract a spatial information efficiently.

BACKGROUND OF THE INVENTION

Recently, with the development of electronic industries and the advance of industrial technologies, various electronic devices are designed and produced toward small size, light weightiness and easy portability. Consequently, these electronic devices can be applied to mobile business, entertainment or leisure purposes whenever or wherever the users are. In these devices, probably the image-taking devices are most widely used as appeared in many kinds of fields, such as smart phones, wearable electronic devices or any other appropriate electronic apparatus. These imaging devices are attractive to daily applications for human because they are small and can be easily carried.

With the improvement of the living quality, people's demands on more functions of the imaging devices are progressively increased. In many circumstances people needs more flexible input/output medium for information transfer or exchange. The examples of media may be virtual keyboard or display by which spatial information is extracted, delivered or recognized via non-typical means. For example, many people are willing to acquire 3D images which can be contributed as a special methodology. Preferably, the 3D image contains accurate spatial information. Indeed, people may like to acquire the distance measuring functions in order to recognize hand gestures with the portable electronic devices. Normally, the spatial or depth information or the distance can be measured by a TOF (Time of Flight) measurement method or a dual camera distance measurement method.

As known, the measured result of the TOF measurement method has good accuracy. However, when the TOF measurement method is expanded to the planar scenario application or the multi-point scenario application, the software computing technology is very complicated and computational load is heavy. Moreover, the additional uses of the specified computing chip and integrated circuits (ICs) require lot of power consumption and high computing cost. Moreover, the TOF measurement method is readily affected by the ambient brightness. If the light pollution in the surroundings is serious, the accuracy of the measured result is low. On the other hand, the software computing technology for the dual camera distance measurement method is somewhat complicated and not easier. Moreover, since the dual camera distance measurement method uses two cameras, the dual camera distance measurement method are advantageous over the TOF measurement method in power consumption and computing cost. However, since the performance of measuring the distance from the smooth surface by the dual camera distance measurement method is inferior, the measured result about the distance from the smooth surface has lower accuracy.

Therefore, there is a need of providing a miniature spatial information capturing device capable of effectively acquiring a spatial distance information of a target object in a quick way.

SUMMARY OF THE INVENTION

An object of the present invention provides a spatial information capturing device capable of effectively acquiring a spatial distance information of a target object in an efficient way. The structure of the spatial information capturing device is thus further simplified. Consequently, the processing procedure of the associated controller is simplified, and then, the cost is reduced.

In accordance with an aspect of the present invention, there is provided a spatial information capturing device. The spatial information capturing device includes a structured light generation module, a camera module and a process controller. The structured light generation module provides a structured light pattern to a target object, so that an evaluation pattern is formed on the target object. The camera module includes a lens group, an optical encoder and a sensing unit. The optical encoder has a reference pattern. The reference pattern and the evaluation pattern have at least one corresponding pattern feature. In addition, both of the reference pattern and the evaluation pattern are projected on the sensing unit. The process controller is in communication with the sensing unit. The process controller compares a pattern feature difference between the reference pattern and the evaluation pattern, and realizes a spatial distance information of the target object according to a result of comparing the pattern feature difference.

In an embodiment, the lens group includes plural lenses, and the optical encoder and the plural lenses are sequentially arranged along an optical axis of the lens group. The evaluation pattern is transmitted through the plural lenses and projected onto the sensing unit along the optical axis. The reference pattern is projected onto the sensing unit along the optical axis. The optical encoder is attached on the lens group, or the optical encoder is separated from the lens group.

In an embodiment, the lens group includes plural lenses. The evaluation pattern is transmitted through the plural lenses and projected onto a first sensing position of the sensing unit. The reference pattern is projected onto a second sensing position of the sensing unit. The first sensing position and the second sensing position are different. The optical encoder is attached on the lens group, or the optical encoder is separated from the lens group.

In an embodiment, the lens group includes a beam splitter and plural lenses, and the beam splitter splits allows light beams to be selectively propagated along a first optical axis or a second optical axis. The evaluation pattern is transmitted through the plural lenses and the beam splitter along the first optical axis and projected onto the sensing unit along the first optical axis. The reference pattern is directed to the beam splitter along the second optical axis and reflected to the sensing unit along the first optical axis. The optical encoder is attached on the lens group, or the optical encoder is separated from the lens group.

In an embodiment, the optical encoder is a self-illuminating element, or the optical encoder is an optical encoding film.

In an embodiment, the optical encoder includes plural liquid crystal structures. The plural liquid crystal structures are managed by a programmable unit, so that the reference pattern is controllable.

In an embodiment, a wavelength of a light beam from the optical encoder is different from a wavelength of a structured light from the structured light generation module.

In an embodiment, the camera module further includes a casing and an adjusting mechanism, and the adjusting mechanism is partially exposed outside the casing. The adjusting mechanism is linked with the optical encoder, and the optical encoder is driven by the adjusting mechanism. Consequently, relative positions between the optical encoder and the lens group and/or relative positions between the optical encoder and the sensing unit are adjustable by a user.

In an embodiment, the structured light generation module includes a light source, a collimating lens and a diffractive optical element. The structured light pattern from the structured light generation module corresponds to the evaluation pattern on the target object. The light source includes a laser diode, a light emitting diode, an organic light emitting diode and/or a light-emitting unit that emits light beams with wavelengths in a thermal band.

In an embodiment, the structured light pattern is a grid pattern, a radial-mesh pattern, a multi-point pattern, a symmetric pattern and/or an asymmetric pattern.

In an embodiment, the structured light generation module and the process controller are dynamically linked with each other. The structured light generation module is adjusted by the process controller according to a dynamic change of the evaluation pattern.

In an embodiment, when a light source of the structured light generation module is adjusted by the process controller, the evaluation pattern is correspondingly changed.

In an embodiment, when a diffractive optical element of the structured light generation module is adjusted by the process controller, the evaluation pattern is correspondingly adjusted.

From the above descriptions, the spatial information capturing device of the present invention is equipped with the optical encoder. The optical encoder has the reference pattern. The evaluation pattern is generated by the structured light generation module and formed on the target object. The reference pattern and the evaluation pattern have at least one corresponding pattern feature. The reference pattern and the evaluation pattern can be simultaneously projected onto the sensing unit. By comparing the pattern feature difference between the reference pattern and the evaluation pattern, the process controller realizes a spatial distance information of the target object. Since it is not necessary to previously store the contents of the reference pattern into the process controller, the additional installing time and the additional labor cost are saved. Moreover, since the processing procedure of the process controller is simplified, the computing and comparing speed will be increased and the computing cost will be reduced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
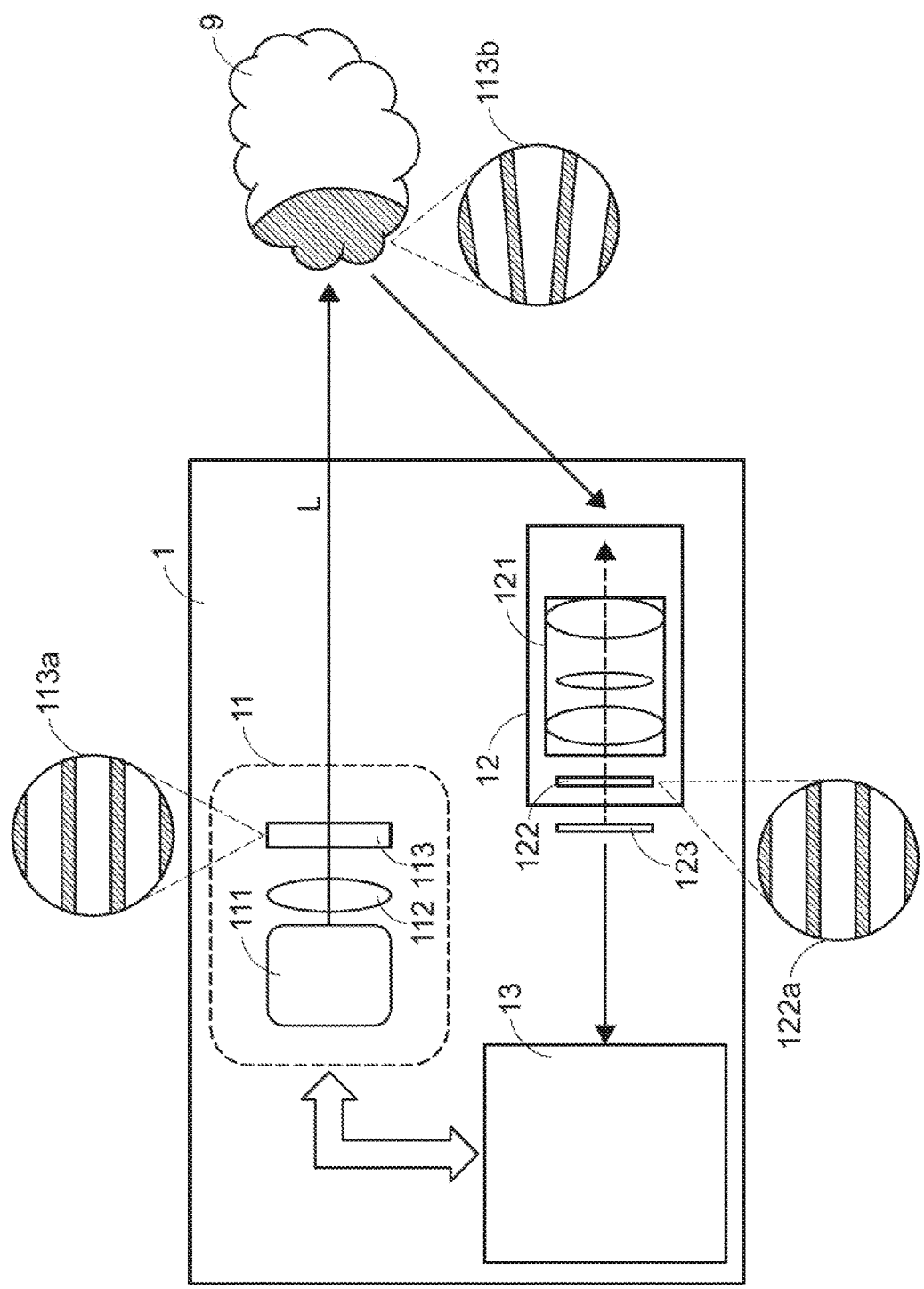
FIG. 1 schematically illustrates a spatial information capturing device for evaluating a target object according to an embodiment of the present invention.

FIG. 1 schematically illustrates a spatial information capturing device for evaluating a target object according to an embodiment of the present invention.

The spatial information capturing device 1 is capable of capturing a spatial information of a target object. In this context, the spatial information contains the height and depth relative to the surface of the target object, the distance between the target object and the spatial information capturing device and any other appropriate spatial information. The spatial information is helpful to create the three-dimensional image. The method of calculating the three-dimensional image in the back-end side is well known to those skilled in the art, and is not redundantly described herein.

As shown in FIG. 1, the spatial information capturing device 1 comprises a structured light generation module 11, a camera module 12 and a process controller 13. For capturing the spatial information of a target object 9, the structured light generation module 11 of the spatial information capturing device 1 provides a structured light L to the target object 9. Consequently, an evaluation pattern 113b is formed on the target object 9. The spatial information of the target object 9 can be acquired according to the evaluation pattern 113b. The method of acquiring the spatial information of the target object 9 will be described later.

First of all, the operations of the structured light generation module 11 will be illustrated as follows. The structured light generation module 11 comprises a light source 111, a collimating lens 112 and a diffractive optical element 113. The light source 111 emits plural light beams. The collimating lens 112 is arranged between the light source 111 and the diffractive optical element 113. The collimating lens 112 is used for collimating the plural light beams. Consequently, the plural collimated light beams are directed to the diffractive optical element 113. The diffractive optical element 113 has a diffractive pattern. After the plural light beams pass through the collimating lens 112 and the diffractive optical element 113, the structured light generation module 11 outputs a structured light pattern 113a.

The light source 111 comprises a laser diode (LD), a light emitting diode (LED), an organic light emitting diode (OLED), and/or a light-emitting unit that emits the light beams with wavelengths in a thermal band. The structured light pattern 113a is a grid pattern, a radial-mesh pattern, a multi-point pattern, a symmetric pattern and/or an asymmetric pattern. It is noted that the example of the structured light pattern 113a is not restricted.

Due to the relative irradiation angle between the structured light generation module 11 and the target object 9 or the lumpy condition of the surface of the target object 9, the evaluation pattern 113b on the target object 9 is distorted and slightly different from the original structured light pattern 113a when the structured light L is projected on the target object 9. However, some relationships between the evaluation pattern 113b and the structured light pattern 113a are stilled retained. For example, these relationships include deviation angles or tilt angles, positions of the corresponding points or lines, sizes of the corresponding points, thicknesses of the corresponding lines, directions of the corresponding lines, curvatures of the corresponding lines, or the like. Please refer to the structured light pattern 113a and the evaluation pattern 113b as shown in FIG. 1. Due to the irradiation angles, the parallel grid-like lines of the structured light pattern 113a are distorted to the nonparallel lines of the evaluation pattern 113b, wherein the left sections of the nonparallel lines are narrower than the right sections of the nonparallel lines. The relationship between the structured light pattern 113a and the evaluation pattern 113b is presented herein for purpose of illustration and description only.

Hereinafter, the structure of the camera module 12 will be illustrated as follows. In this embodiment, the camera module 12 comprises a lens group 121, an optical encoder 122 and a sensing unit 123. In accordance with a feature of the present invention, the optical encoder 122 has a reference pattern 122a. Preferably, the reference pattern 122a is specially designed such that the reference pattern 122a is identical or similar to the structured light pattern 113a. The optical encoder 122 is used for providing the reference pattern 122a and projecting the reference pattern 122a onto the sensing unit 123 of the camera module 12. Consequently, the reference pattern 122a is sensed by the sensing unit 123 and used as a comparison basis. That is, the reference pattern 122a is correlated with a first pattern that is projected on the sensing unit 123. Moreover, the evaluation pattern 113b on the target object 9 is also sensed and captured by the sensing unit 123 of the camera module 12. Consequently, the evaluation pattern 113b is sensed by the sensing unit 123. That is, the evaluation pattern 113b is correlated with a second pattern that is projected on the sensing unit 123. The sensing unit 123 is in communication with the process controller 13. Then, the process controller 13 compares the pattern feature difference between the reference pattern 122a (i.e., the first pattern) and the evaluation pattern 113 (i.e., the second pattern). According to the comparing result, the process controller 13 can calculate the spatial information of the target object 9. The operating principles of the present invention have been mentioned as above.

Especially, it is not necessary that the reference pattern 122a and the evaluation pattern 113b are completely identical. In an embodiment, only a part of the reference pattern 122a and a part of the evaluation pattern 113b are identical. That is, the reference pattern 122a and the evaluation pattern 113b have at least one corresponding pattern feature. The identical part of the reference pattern 122a and the evaluation pattern 113b can be used for comparison.

Moreover, the structured light generation module 11 and the process controller 13 are dynamically linked with each other. Consequently, the structured light generation module 11 is actively or passively adjusted by the process controller 13 according to a dynamic change of the evaluation pattern 113b. For example, when the light source 111 of the structured light generation module 11 is adjusted by the process controller 13, the evaluation pattern 113b is correspondingly adjusted. Alternatively, when the diffractive optical element 113 of the structured light generation module 11 is adjusted by the process controller 13, the evaluation pattern 113b is correspondingly adjusted. The image capturing mechanism and the contents of the camera module will be illustrated in more details as follows.

For well understanding the concepts of the present invention, three examples of the camera module will be illustrated as follows. In these examples, the reference pattern of the optical encoder and the evaluation pattern on the target object can be effectively captured by the sensing unit of the camera module. By comparing the difference between the reference pattern and the evaluation pattern, the process controller can calculate the spatial information of the target object.

Figure 2:
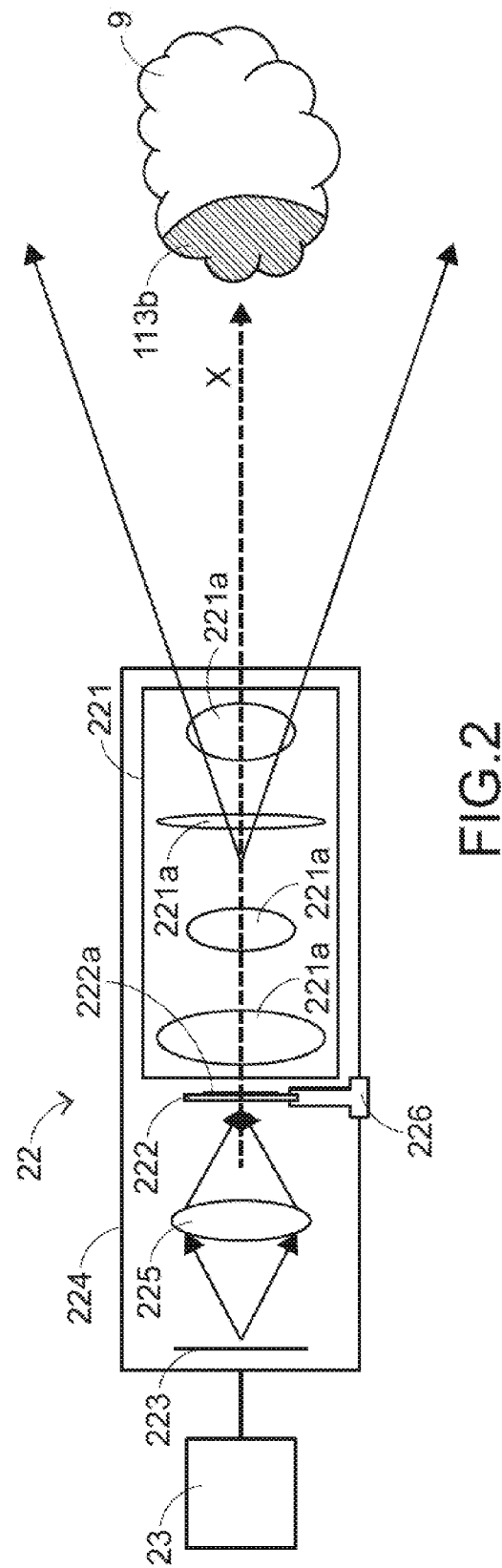
FIG. 2 schematically illustrates a camera module according to a first embodiment of the present invention.

FIG. 2 schematically illustrates a camera module according to a first embodiment of the present invention. In this embodiment, the camera module 22 comprises a lens group 221, an optical encoder 222 and a sensing unit 223. The lens group 221, the optical encoder 222 and the sensing unit 223 are sequentially arranged along an optical axis X. The lens group 221 comprises plural lenses 221a. Moreover, after the light beams corresponding to the evaluation pattern 113b on the target object 9 pass through the plural lenses 221a, the light beams are directed along the optical axis X and imaged on the sensing unit 223. Consequently, the image of the evaluation pattern 113b is captured by the sensing unit 223. On the other hand, after the light beams corresponding to the reference pattern 222a on the optical encoder 222 pass through a lens 225, the light beams are imaged on the sensing unit 223. Consequently, the image of the reference pattern 222a is captured by the sensing unit 223. Since the lens group 221, the optical encoder 222 and the sensing unit 223 are sequentially arranged along the optical axis X, the captured image of the evaluation pattern 113b and the captured image of the reference pattern 222a are at least partially overlapped with each other. After calculation, the process controller 23 acquires the spatial information of the target object 9.

For clearly imaging the reference pattern 222a on the sensing unit 223, the lens 225 is arranged between the optical encoder 222 and the sensing unit 223. Preferably, the distance between the optical encoder 222 and the lens 225 is equal to the distance between the lens 225 and the sensing unit 223. In an embodiment, the optical encoder 222 is attached on the lens group 221. Alternatively, in another embodiment, the optical encoder 222 and the lens group 221 are separated from each other.

The optical encoder 222 used in the camera module 22 has two implementation examples. In a first implementation example, the optical encoder 222 is a self-illuminating element. For example, the optical encoder 222 comprises plural liquid crystal structures. These liquid crystal structures are managed and controlled by a programmable unit (not shown), so that the pattern formed on the optical encoder 222 is controllable. For acquiring the spatial information, the programmable unit controls the optical encoder 222. Consequently, the reference pattern 222a formed on the optical encoder 222 corresponds to the structured light pattern that is generated by the structured light generation module. Under this circumstance, the reference pattern 222a corresponds to the evaluation pattern 113b on the target object 9. In a second implementation example, the optical encoder 222 is an optical encoding film. After the ambient light enters the camera module 22 and passes through the optical encoding film, the reference pattern 222a on the optical encoding film can be imaged onto the sensing unit 223.

For enhancing discrimination between the image of the evaluation pattern 113b and the image of the reference pattern 222a which are captured by the sensing unit 223, the wavelength of the light beam from the optical encoder 222 and the wavelength of the structured light L are different. Since the discrimination between these two captured images is enhanced, the computing accuracy is increased.

Moreover, for adjusting the change amount of the captured image on the sensing unit 223 corresponding to the reference pattern 222a, the camera module 22 is further equipped with a casing 224 and an adjusting mechanism 226. The adjusting mechanism 226 is partially exposed outside the casing 224. In addition, the adjusting mechanism 226 is linked with the optical encoder 222. When the adjusting mechanism 226 is operated by a user, the optical encoder 222 is moved upwardly, downwardly, leftwards, rightwards, forwardly or backwardly with the motion of the adjusting mechanism 226. Consequently, the relative positions between the optical encoder 222 and the lens group 221 and/or the relative positions between the optical encoder 222 and the sensing unit 223 are adjustable.

Figure 3:
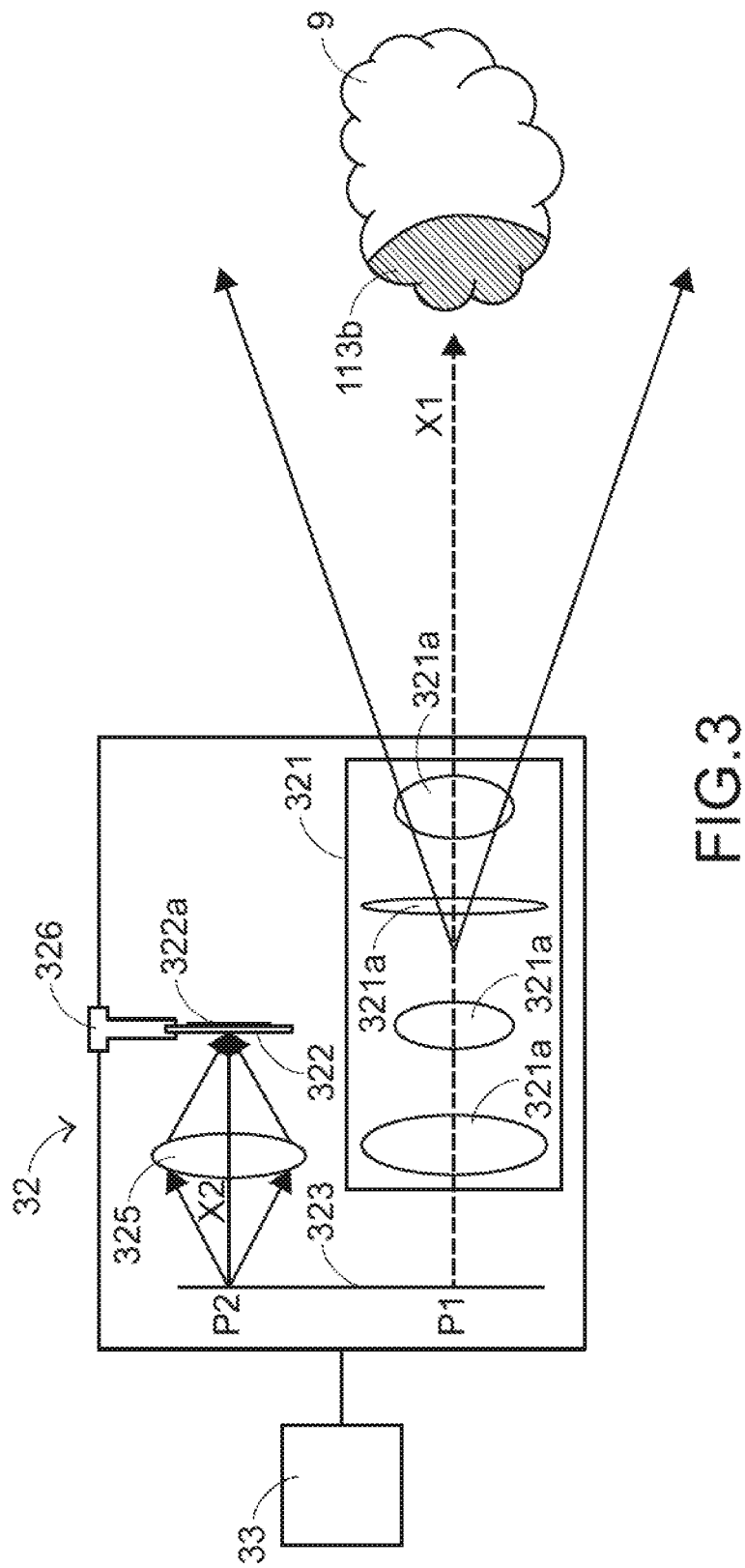
FIG. 3 schematically illustrates a camera module according to a second embodiment of the present invention.

FIG. 3 schematically illustrates a camera module according to a second embodiment of the present invention. The components of the camera module of the second embodiment are similar to those of the first embodiment. In this embodiment, the camera module 32 comprises a lens group 321, an optical encoder 322 and a sensing unit 323. In comparison with the first embodiment, the relative positions between the optical encoder 322 and the lens group 321 of the camera module of this embodiment are distinguished. The lens group 321 comprises plural lenses 321a. After the light beams corresponding to the evaluation pattern 113b on the target object 9 are transmitted through the plural lenses 321a along a first optical axis X1, the light beams are imaged on a first sensing position P1 of the sensing unit 323. Consequently, the image of the evaluation pattern 113b is captured by the sensing unit 323. On the other hand, after the light beams corresponding to the reference pattern 322a on the optical encoder 322 are transmitted through a lens 325 along a second optical axis X2, the light beams are imaged on a second sensing position P2 of the sensing unit 323. Consequently, the image of the reference pattern 322a is captured by the sensing unit 323.

In this embodiment, the first optical axis X1 and the second optical axis X2 are in parallel with each other, or the first optical axis X1 and the second optical axis X2 are nearly in parallel with each other. Consequently, the first sensing position P1 and the second sensing position P2 are different. Since the lens group 321 and the optical encoder 322 are arranged side by side, the imaging path of the light beams from the evaluation pattern 113b on the target object 9 to the sensing unit 323 is not obstructed by the optical encoder 322. Moreover, the process controller 33 can acquire the spatial information of the target object 9 according to the overlap region between the captured image of the evaluation pattern 113b and the captured image of the reference pattern 322a, or the process controller 33 can acquire the spatial information of the target object 9 by directly calculating the pattern feature difference between the captured image of the evaluation pattern 113b and the captured image of the reference pattern 322a.

For clearly imaging the reference pattern 322a on the sensing unit 323, the lens 325 is arranged between the optical encoder 322 and the sensing unit 323. Preferably, the distance between the optical encoder 322 and the lens 325 is equal to the distance between the lens 325 and the sensing unit 323. Moreover, for adjusting the change amount of the captured image on the sensing unit 323 corresponding to the reference pattern 322a, the camera module 32 is further equipped with an adjusting mechanism 326. The adjusting mechanism 326 is used for adjusting the relative positions between the optical encoder 322 and the sensing unit 323.

Figure 4:
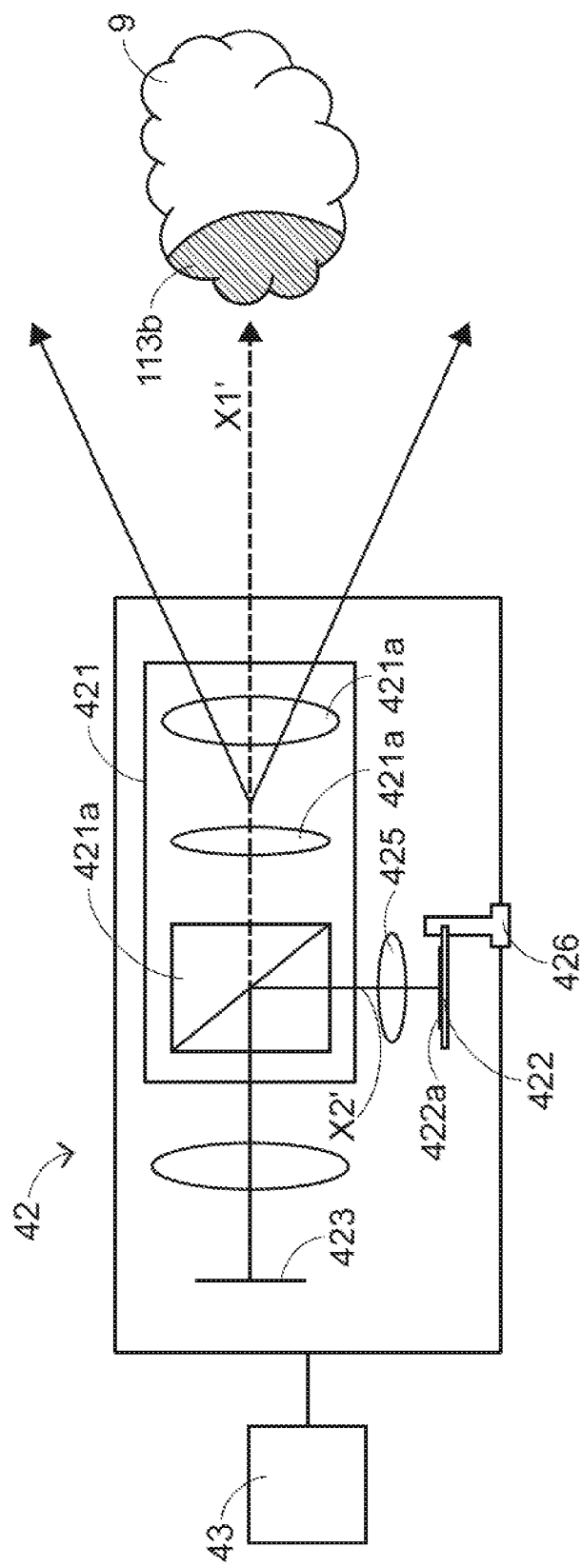
FIG. 4 schematically illustrates a camera module according to a third embodiment of the present invention.

FIG. 4 schematically illustrates a camera module according to a third embodiment of the present invention. The components of the camera module of the third embodiment are similar to those of the first embodiment. In this embodiment, the camera module 42 comprises a lens group 421, an optical encoder 422 and a sensing unit 423. In comparison with the above two embodiments, the relative positions between the optical encoder 422 and the lens group 421 of the camera module of this embodiment are distinguished, and the camera module 42 of this embodiment further comprises a beam splitter 421b. The lens group 421 comprises plural lenses 421a and the beam splitter 421b. The beam splitter 421b allows the light beams to be selectively propagated along a first optical axis X1' or a second optical axis X2'. After the light beams corresponding to the evaluation pattern 113b on the target object 9 are transmitted through the plural lenses 421a and the beam splitter 421b along the first optical axis X1', the light beams are imaged on the sensing unit 423 along the first optical axis X1'. On the other hand, after the light beams corresponding to the reference pattern 422a on the optical encoder 422 are transmitted through a lens 425 along a second optical axis X2' and reflected by the beam splitter 421b, the light beams are imaged on the sensing unit 423 along the first optical axis X1'.

In this embodiment, the first optical axis X1' and the second optical axis X2' are perpendicular to each other, or the first optical axis X1' and the second optical axis X2' are nearly perpendicular to each other. Since the optical encoder 422 is not arranged along the first optical axis X1', the imaging path of the light beams from the evaluation pattern 113b on the target object 9 to the sensing unit 423 is not obstructed by the optical encoder 422. According to the relative positions between the beam splitter 421b, the lens group 421 and the optical encoder 422, the captured image of the evaluation pattern 113b and the captured image of the reference pattern 422a are at least partially overlapped with each other. After calculation, the process controller 43 acquires the spatial information of the target object 9.

Moreover, for adjusting the change amount of the captured image on the sensing unit 423 corresponding to the reference pattern 422a, the camera module 42 is further equipped with an adjusting mechanism 426. The adjusting mechanism 426 is used for adjusting the relative positions between the optical encoder 422 and the beam splitter 421b.

From the above descriptions, the spatial information capturing device of the present invention is equipped with the optical encoder. The reference pattern on the optical encoder and the evaluation pattern on the target object are simultaneously projected onto the sensing unit. Accordingly, the process controller can calculate the spatial distance information of the target object. Since it is not necessary to previously store the contents of the reference pattern into the process controller, the additional installing time and the additional labor cost are saved. Moreover, since the computation of the process controller is simplified, the computing and comparing speed will be increased.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A spatial information capturing device, comprising:
   a structured light generation module providing a structured light pattern to a target object, so that an evaluation pattern is formed on the target object;
   a camera module comprising a lens group, an optical encoder and a sensing unit, wherein the optical encoder has a reference pattern, and the reference pattern and the evaluation pattern have at least one corresponding pattern feature, wherein both of the reference pattern and the evaluation pattern are projected on the sensing unit; and a process controller in communication with the sensing unit, wherein the process controller compares a pattern feature difference between the reference pattern and the evaluation pattern, and realizes a spatial distance information of the target object according to a result of comparing the pattern feature difference, wherein the camera module further comprises:
a casing; and
an adjusting mechanism, the adjusting mechanism being partially exposed outside the casing, and wherein the adjusting mechanism is linked with the optical encoder, and the optical encoder is driven by the adjusting mechanism, so that relative positions between the optical encoder and the lens group and/or relative positions between the optical encoder and the sensing unit are adjustable by a user.

2. The spatial information capturing device according to claim 1, wherein the lens group comprises plural lenses, and the optical encoder and the plural lenses are sequentially arranged along an optical axis of the lens group, wherein the evaluation pattern is transmitted through the plural lenses and projected onto the sensing unit along the optical axis, and the reference pattern is projected onto the sensing unit along the optical axis, wherein the optical encoder is attached on the lens group, or the optical encoder is separated from the lens group.

3. The spatial information capturing device according to claim 1, wherein the lens group comprises plural lenses, the evaluation pattern is transmitted through the plural lenses and projected onto a first sensing position of the sensing unit, and the reference pattern is projected onto a second sensing position of the sensing unit, wherein the first sensing position and the second sensing position are different, wherein the optical encoder is attached on the lens group, or the optical encoder is separated from the lens group.

4. The spatial information capturing device according to claim 1, wherein the lens group comprises a beam splitter and plural lenses, and the beam splitter splits allows light beams to be selectively propagated along a first optical axis or a second optical axis, wherein the evaluation pattern is transmitted through the plural lenses and the beam splitter along the first optical axis and projected onto the sensing unit along the first optical axis, and the reference pattern is directed to the beam splitter along the second optical axis and reflected to the sensing unit along the first optical axis, wherein the optical encoder is attached on the lens group, or the optical encoder is separated from the lens group.

5. The spatial information capturing device according to claim 1, wherein the optical encoder is a self-illuminating element, or the optical encoder is an optical encoding film.

6. The spatial information capturing device according to claim 1, wherein the optical encoder comprises plural liquid crystal structures, wherein the plural liquid crystal structures are managed by a programmable unit, so that the reference pattern is controllable.

7. The spatial information capturing device according to claim 1, wherein a wavelength of a light beam from the optical encoder is different from a wavelength of a structured light from the structured light generation module.

8. The spatial information capturing device according to claim 1, wherein the structured light generation module comprises a light source, a collimating lens and a diffractive optical element, wherein the structured light pattern from the structured light generation module corresponds to the evaluation pattern on the target object, wherein the light source comprises a laser diode, a light emitting diode, an organic light emitting diode and/or a light-emitting unit that emits light beams with wavelengths in a thermal band.

9. The spatial information capturing device according to claim 8, wherein the structured light pattern is a grid pattern, a radial-mesh pattern, a multi-point pattern, a symmetric pattern and/or an asymmetric pattern.

10. The spatial information capturing device according to claim 1, wherein the structured light generation module and the process controller are dynamically linked with each other, wherein the structured light generation module is adjusted by the process controller according to a dynamic change of the evaluation pattern.

11. The spatial information capturing device according to claim 10, wherein when a light source of the structured light generation module is adjusted by the process controller, the evaluation pattern is correspondingly changed.

12. The spatial information capturing device according to claim 10, wherein when a diffractive optical element of the structured light generation module is adjusted by the process controller, the evaluation pattern is correspondingly adjusted.

* * * * *